INVENTOR.
ARTHUR S. CHAPMAN,
BY
ATTORNEY.

United States Patent Office 3,420,594
Patented Jan. 7, 1969

3,420,594
OPTICAL SCANNING SYSTEM
Arthur S. Chapman, Rolling Hills, Calif., assignor to Hughes Aircraft Company, Culver City, Calif., a corporation of Delaware
Filed Aug. 2, 1965, Ser. No. 477,658
U.S. Cl. 350—23         9 Claims
Int. Cl. G02b 23/02; G02b 17/00; G02b 1/00

ABSTRACT OF THE DISCLOSURE

A stabilized optical scanning arrangement is provided designed to eliminate image rotation when the system is currently moved in both azimuth and elevation. An outer gimbal is provided for journal movement in azimuth and an inner gimbal is pivoted to the outer gimbal for journal movement in elevation. Independently movable shafts are provided concentric with the axes of azimuth and elevation movement. The shafts carry reflector mirrors in optical alignment with the scanning mirrors carried by the respective gimbals. Movement of each reflecting mirror results from a rollable driving interconnection with both the azimuth gimbal and the elevational gimbal which results in rotational movement of each reflecting mirror in one half angular relationship to the rotational movement of the azimuth and elevational gimbals.

---

The invention relates to a stabilized optical sighting arrangement and is particularly directed to an optical system enabling an operator to view scan in both elevation and azimuth without introducing image-rotation into the system.

Optical scanning sights of the type here under consideration, employ a viewing eyepiece in fixed relation to the operator and an optomechanical system of reflecting mirrors carried by a plurality of gimbals, the latter also supporting a telescope objective. This permits both elevation and azimuth scanning. Such an arrangement is commonly known as a two-axis panoramic periscope type optical sight. The panoramic characteristic of such a sight is needed in many applications in order to allow for aircraft or ship maneuvers while providing stable wide angle scan coverage.

It is well known, in the optical field, that such systems introduce image-rotation at the eyepiece which is proportional to the algebraic sum of the gimbal angles as the image is channeled through the system and delivered to the eyepiece. In order, therefore, that the operator view an accurate image of the scanned scene, it is necessary that an image-derotation device be introduced into the optomechanical system. There have been at least five different arrangements heretofore used to accomplish such image-derotation. Typical examples of such devices are the Drove prism or the double Drove prism which present a practical disadvantage in that they may be used only with collimated light. A Pechan prism has also been used to accomplish derotation, but is not universally applicable because it will not accept rays of light inclined at an angle more than 6° and total internal reflection must occur. The Delta prism heretofore used will also accomplish derotation but it also suffers from the disadvantage of only accepting collimated light. Another arrangement, known to the art is the "K" mirror, has found general acceptance because it will accomplish derotation in convergent light and utilizes only mirrors. However, the device is usually rather large physically and a delicate balance arrangement is required.

Further considerations relating to heretofore adopted derotation devices relate to expense, size and weight. All of the aforementioned devices require auxiliary servo equipment which will allow them to be rotated in the optomechanical system in synchronism with the gimbal motion and through an angle equal to one-half the algebraic sum of gimbal angle rotation. Patently, such structure introduces important additional expense, greatly increases the size and weight of the arrangement, as well as creating the possibility of introducing mechanical errors into the system.

It is therefore a primary object of the invention to provide an optomechanical reflection system which will deliver an image to a viewing eyepiece in a nonrotated condition.

It is another object of the invention to provide a system of the type referred to that is comparatively inexpensive in initial cost and importantly reduces the size and total weight as compared with the arrangements heretofore used.

It is a further object of the invention to provide a derotation arrangement that will deliver an accurately derotated image to an eyepiece and avoids introduction of mechanical error.

The invention accomplishes the stated objectives by provision, in the optomechanical system, of reflective mirrors which are driven or angularly moved in response to gimbal movement and in predetermined angular relation to the angle of gimbal movement. Specifically, the image-relaying mirrors are physically located in determined relation to the respective gimbals, one mirror is driven by movement of the elevation gimbal and in half-angle relation to gimbal movement and the other mirror is driven by the azimuth gimbal, again in half-angle relation to the gimbal movement. Image rotation, while scanning in azimuth and elevation, is thus avoided. The arrangement requires no servos or other auxiliary equipment and therefore results in an important overall simplification of the sighting equipment.

These and other objectives and features of the invention will become apparent in the course of the following description and from an examination of the related drawings, wherein.

Figure 1:
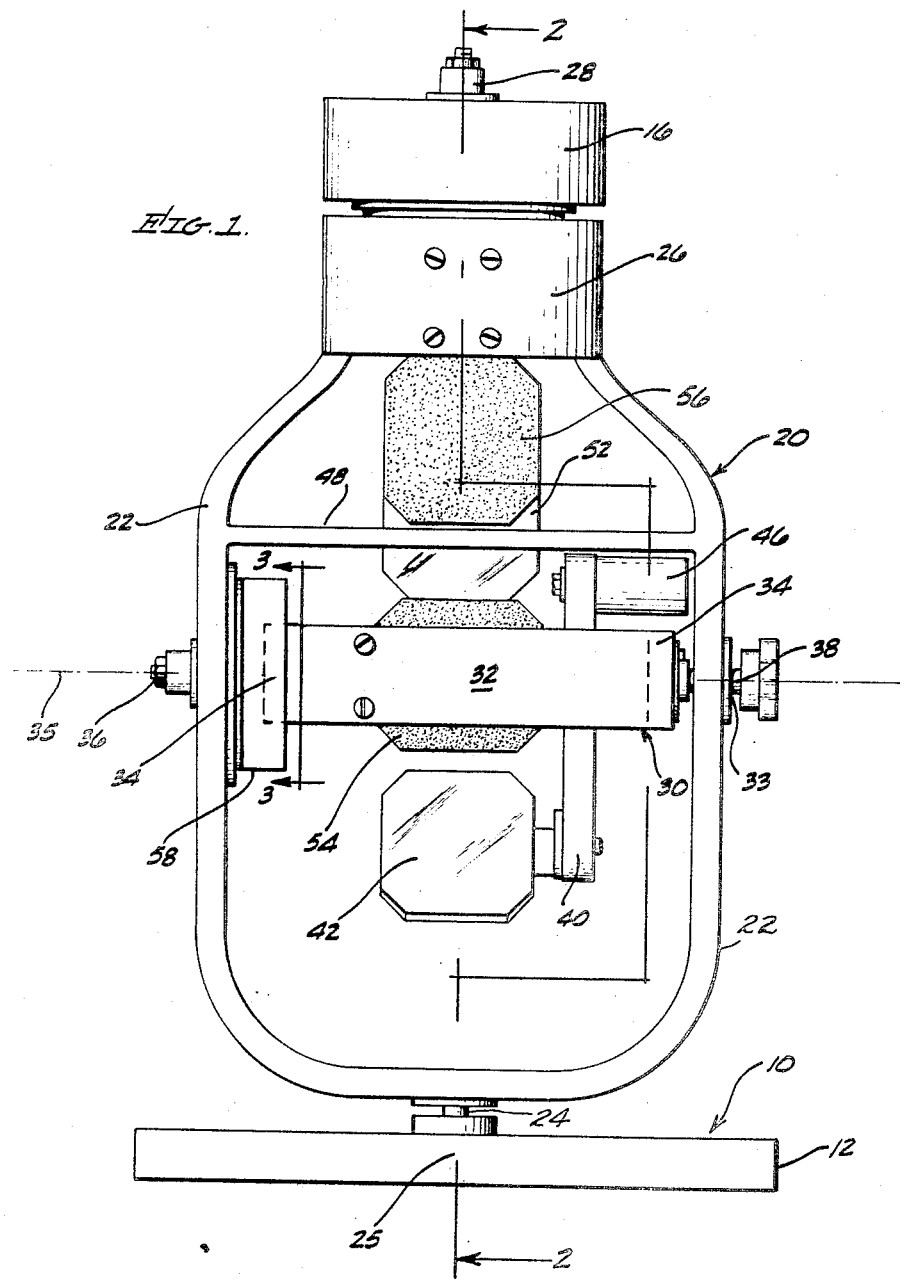
FIG. 1 is a front elevational view of embodiment of the optomechanical system.
Figure 3:
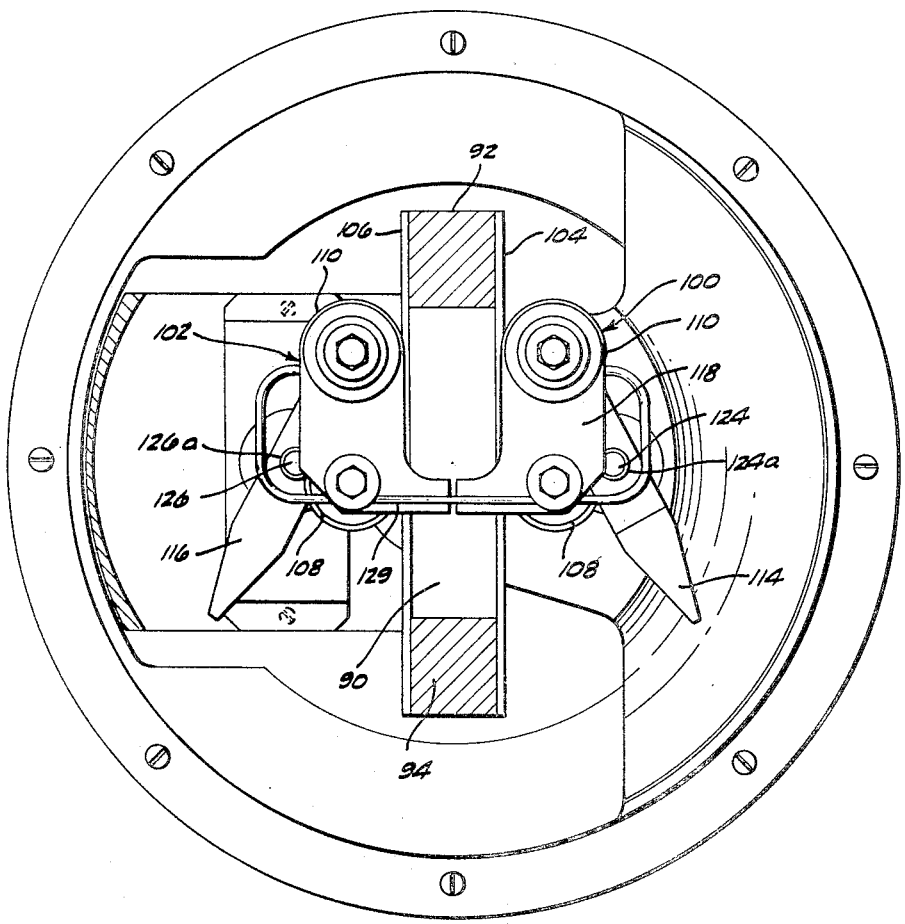

FIG. 3 is a sectional view taken along line 3—3 of FIG. 1 and illustrates internal operating structure in housing 58, it being understood that the operational structure in housing 26 is identical in form and function with that in housing 58.

Figure 4:
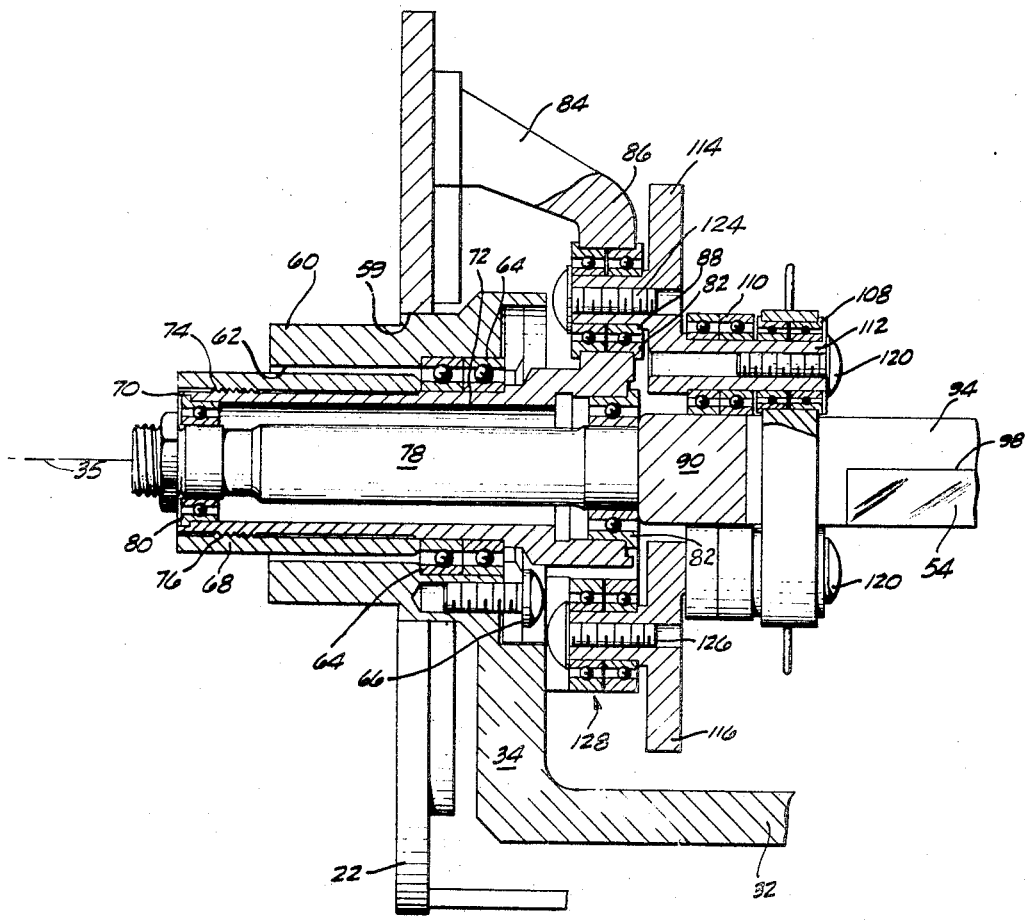
Figure 5:
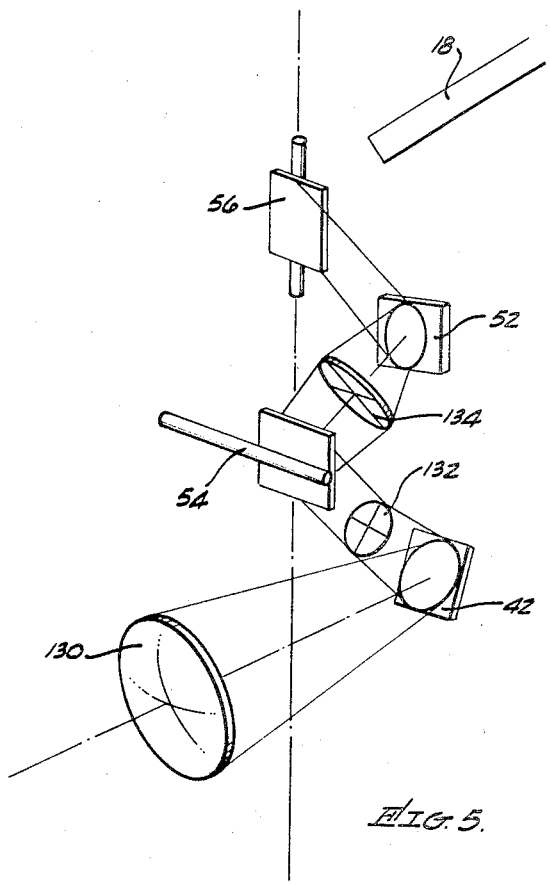

FIG. 4 is a vertical sectional view, partially in elevation, of the structure shown in FIG. 3; and FIG. 5 is a schematic perspective view of the optomechanical system herein disclosed.

Figure 2:
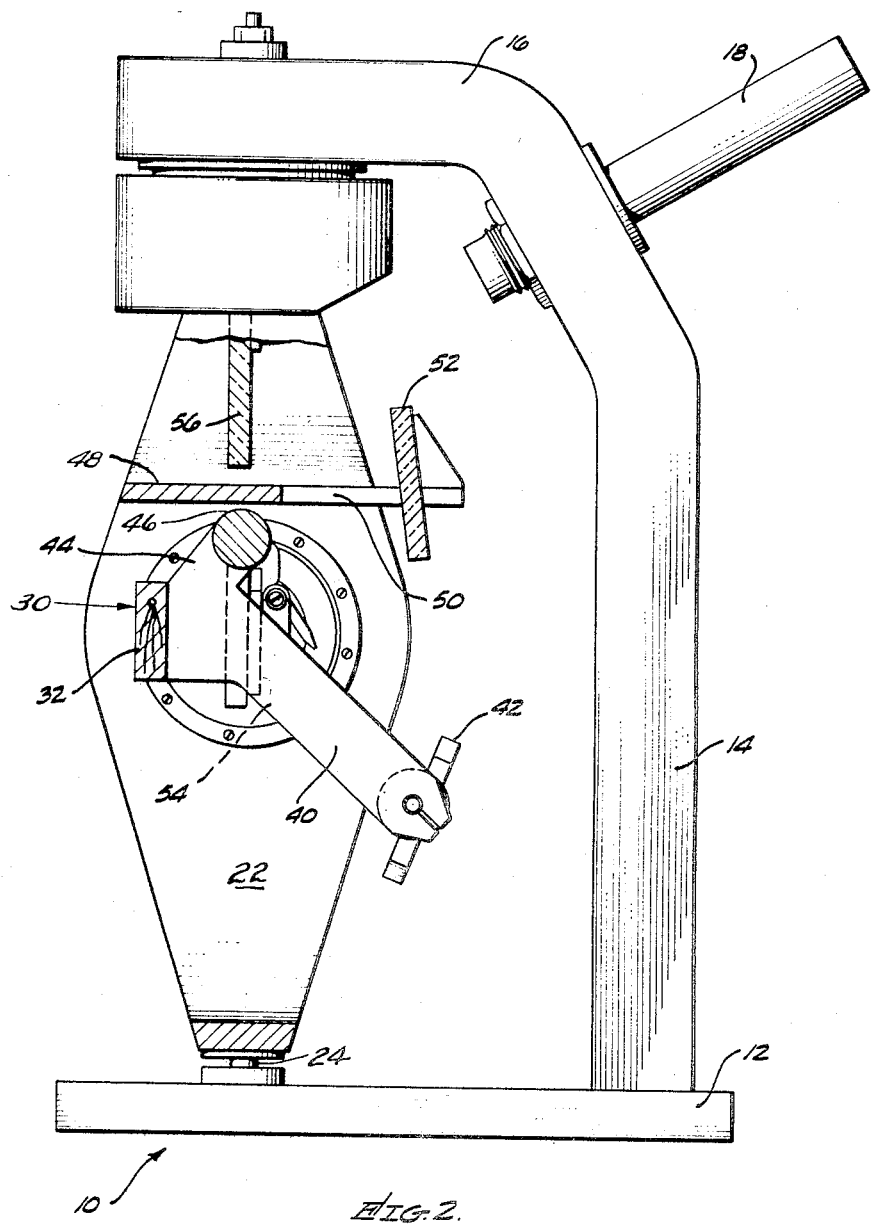
FIG. 2 is a sectional view, in side elevation, and taken along line 2—2 of FIG. 1.

Describing the invention in detail and directing attention to FIGS. 1 and 2, the numeral 10 generally indicates a fixed frame having a baseplate 12 and an upstanding wall 14, the latter having, at its upper terminus a horizontal plate 16 which is in overlying relation with the baseplate 12. A viewing eyepiece, of conventional form, is indicated by the numeral 18 and is carried by the upstanding wall 14 in fixed relation to the frame 10.

An outer gimbal arrangement in indicated generally at 20, said gimbal comprising spaced brackets 22, 22, said brackets being joined at the lower aspect thereof to carry shaft 24, the latter accommodating pivotal movement of the gimbal 20 about axis 25. At the upper aspects of the brackets 22, 22, a housing 26 joins said brackets and provides means, hereinafter described, accommodating said pivotal movement of gimbal 20 about axis 25. Thus, pivotal movement in azimuth is permitted.

A second or inner gimbal is indicated generally at 30 and comprises an elongated plate 32 and perpendicular thereto, end walls 34, 34, which project internally of the outer gimbal 20 in telescopic relation to brackets 22, 22. A shaft 33 pivotally connects one wall 34 to a bracket 22. Structure is provided, hereinafter described, within housing 58 to pivotally mount the related end of gimbal 30 to adjacent bracket 22 and to accommodate said pivotal movement about axis 35.

At the right hand aspect, as seen in FIG. 1, the inner gimbal 30 has a projecting arm 40 integrally formed therewith which extends outwardly and angularly from the plate 32 and carries, at its outer end, a first reflecting mirror 42 in fixed relation to the arm 40. A second arm 44 is integrally formed with the arm 40 and extends generally upwardly to carry, at its terminus, a balance weight 46. Thus, the inner gimbal is delicately balanced so that the mirror 42, when scanning in elevation, may be moved to any position relative to the outer gimbal 20 and maintained in that position without accidental torquing movement due to imbalance.

The brackets 22, 22 of the outer gimbal 20 are joined, adjacent their upper aspects, by a wall 48, the latter including a projection 50 which carries another mirror 52 in fixed relation to the outer gimbal. It will thus be noted that the mirrors 42 and 52 are always maintained in a common vertical plane (FIG. 1) regardless of elevation or azimuth rotation of the inner and outer gimbals 30 and 20, respectively.

Attention is now directed to FIG. 3. The structure of FIG. 3 is that herein employed to accommodate gimbal pivot and half angle rotation relative thereto of reflecteive mirrors 54 and 56. The structure shown in FIG. 3 is contained in both the housings 26 and 58 to accommodate the motion of both inner and outer gimbals 30 and 20. That is, the structure in both housings is identical. Accordingly, the description given will be limited to structure in housing 58.

The bracket 22 has an opening 59 for a cylindrical housing 60, said housing having an internal cylindrical cavity 62. The cavity 62 provides a seat for the other race of bearings 64, 64. The housing 60 is integrally connected to the adjacent wall 34 of the inner gimbal 30, the latter being integrally formed with plate 32 of said gimbal. Plate and cap screw assembly 66 retains the outer race of bearing 64 in position. Within a cavity 62 of the housing 60 a secondary housing arrangement 68 is disposed and comprises an inner cylinder 70 which forms the seat, as at 72, for the inner race of bearings 64. A bearing retainer element 74 is threadably connected, as at 76, to the inner cylinder 70 and acts to retain the bearings 64 in position. The inner cylinder 70 is also hollow and telescopically receives shaft 78, the latter being mounted for rotatable movement therein by the spaced bearings 80 and 82 carried at opposed ends of the inner cylinder 70.

The bracket 22 has fixedly mounted thereon an inwardly extending arm or bracket 84, the latter, at its inner terminus, having a segment 86 extending inwardly of the outer gimbal 20 and paralleling bracket 22. The cylinder 70, heretofore mentioned, is fixedly attached to the segment 86 as at 88. Thus, by virtue of the supporting connection 88 between the inner cylinder 70 and the bracket segment 86, the housing 68 is fixedly carried with reference to the bracket 22 while the first housing 60, which is fixedly connected to inner gimbal 30 may freely pivot about axis 35. Additionally, the inner shaft 78, by virtue of the bearing mountings 80 and 82, will pivotally move about axis 35.

The shaft 78 is directed inwardly of the outer gimbal 20 and carries thereon a segment or transverse bar 90 extending transversely of the axis of the shaft 78. The segment 90 is provided, at its opposed ends, with inwardly directed segments 92 and 94 which are arranged to parallel the axis 35 and in spaced relation therefrom. The segments 92 and 94 provide support for a relay mirror 54 (FIGS. 1 and 4) the latter being in vertical plane relationship with the heretofore mentioned mirrors 42 and 52. It will be noted that the reflecting surface 98 of the mirror 54 is bisected by the horizontal axis 35.

Recalling, derotation is accomplished in the optomechanical system when a reflecting mirror is placed in series relationship therein and rotated at half the angular rate of the rotation of the driving gimbal. To accomplish such rotation rate reduction, a pair of driving roller assemblies 100 and 102 are provided in intimate rollable engagement with opposed surfaces 104 and 106 of the transverse bar or segment 90. Each assembly comprises a plurality of bearing rollers 108 and 110 journally mounted on segment 112 of connecting links 114 and 116. A plate 118 maintains the bearings 108 and 110 in proper position and is secured to the arrangement by cap screws 120, 120. The lower aspect of driving arrangement 100 is pivoted as at 124 to the inwardly extending arm or bracket 84, thus providing a fixed pivot with reference to the gimbal 20. The lower aspect of link 116 of the driving arrangement 102 is pivoted as at 126 to a segment 128 of the inner cylinder 70 which in turn is fixedly connected to the inner gimbal 30. The radius of rotation of the driving elements 100 and 102 about their respective pivots 124 and 126 is identical. Additionally, a spring clip 129 spans the arrangements 100 and 102, biasingly urging said roller arrangements into the noted intimate engagement with the opposed surface of the transverse bar 90.

A particular advantage of the driving arrangement employed is that any lost motion or backlash inherent in gear reduction systems is eliminated. Thus, distortions or other errors in the system are avoided.

It is noted the structure shown in FIGS. 3 and 4 is also disposed in housing 26 to effect one-half angle rotation of mirror 56. Within said housing 26 a pivot 124a (FIG. 3) which is identical with pivot 124 is connected via a bracket identical with bracket 84 to plate 16 of frame 10 as shown in phantom in FIG. 4. Likewise, pivot 126a which is identical with pivot 126 (FIG. 3) is mounted relative to bracket 22 as shown in phantom in FIG. 4. This half angle rotation of mirror 56 is achieved as a result of drive between outer gimbal 20 and frame 10. Also, the reflecting surface of mirror 56 is bisected by axis 25.

In the operation of the arrangement, it will be understood that the inner gimbal 30 may pivot in the vertical plane and thus scan in elevation. Independently or concurrently the outer gimbal 20 may be rotated horizontally and thus scan in azimuth. The fact that the mirrors 42, 54, 52 and 56 are in vertical plane alignment, it will be apparent that the image received at mirror 42 will be reflected to the fixed eyepiece 18 regardless of angular deflection of the gimbals 20 and 30. The driving mechanism noted, which interconnects the gimbals 20 and 30 and serves to rotate the mirror 54 at an angular rate equal to one-half of the motion of the inner gimbal 30, prevents rotation of the image that is reflected from the mirror 42 to the mirror 54. The driving mechanism that rotates mirror 54 at an angular rate equal to one-half the rate of rotation of the outer gimbal 20 prevents rotation of the image reflected from mirror 54 to mirror 56 via mirror 52. The mirror 56 is always in viewing elationship with the fixed eyepiece 18.

The schematic view of FIG. 5 will more clearly illustrate the operation of the invention, it being understood that a gimbal mounted telescope objective 130 has been added thereto. The image received at the objective 130 is focused on the reflecting surface of the mirror 42 which in turn reflects the image to the reflecting surface of mirror 54. A relay lens 132 may be interposed between the noted mirrors to provide proper focus on the surface of mirror 54. A second relay lens 134 may be operatively interposed between the mirror 54 and the mirror 52 to assure proper image focus on the latter.

Mirror 54, in turn, reflects the image to relay mirror 56 which in turn is in operative alignment with the focal point of the eyepiece 18. It will be noted that optical path length between eyepiece 18 and relay mirror 56 remains the same for all angular positions of the latter. As a result of the driving structure heretofore noted, mirror 56 is rotated concurrently with and through half the angular movement of the outer gimbal 20. Similarly, mirror 54 is rotated concurrently with and at half the angular movement of the inner gimbal 30. Thus, the image received by the telescope objective 130 as it is scanned both in azimuth and in elevation is accurately transmitted to the eyepiece 18 and rotation thereof avoided.

The invention is shown by way of illustration and in limitation and may be modified in many particulars, all within the scope of the appended claims.

What is claimed is:

1. In an optical scanning arrangement having a relatively fixed frame the combination of a first movable gimbal carried by said frame
    a second gimbal carried by the first gimbal and movable relative thereto about a determined axis,
    primary reflecting means fixedly carried by the respective gimbals for movement therewith,
    a first and second secondary reflecting means reflectively interposed between the primary reflecting means,
    said first and second secondary reflecting means being independently movable about the axis of movement of said second gimbal,
    and first and second means interconnecting the gimbals and drivingly associated with said first and second secondary reflecting means to move the latter in response to and in predetermined relation with the movement of one of said gimbals.

2. An optical scanning arrangement according to claim 1,
    wherein said secondary reflecting means are pivotally movable in response to pivotal movement of the related gimbals.

3. An optical scanning arrangement according to claim 2,
    wherein each of said secondary reflecting means are moved through an arc equal to one-half the arcuate movement of the related gimbal.

4. An optical scanning arrangement according to claim 3,
    wherein said first mentioned interconnecting means comprises a rotatable shaft supporting said first secondary reflecting means,
    an element carried by the shaft transversely thereof,
    driving members embracing the element,
    one of said members being pivoted to said first gimbal,
    the other of said members being pivoted to said second gimbal.

5. An optical scanning arrangement according to claim 4,
    wherein said second mentioned interconnecting means comprises a rotatable shaft supporting said second secondary reflecting means,
    another element carried by the shaft transversely thereof,
    other driving members embracing said other element,
    one of said other members being pivoted to the frame,
    the other of said other members being pivoted to said first gimbal.

6. An optical scanning arrangement according to claim 5,
    wherein each of said interconnecting means includes spring means embracing the related driving members and urging same into intimate engagement with opposed surfaces of the related element.

7. An optical scanning arrangement according to claim 6,
    wherein said driving members are pairs of rollers,
    said reflecting means comprising a plurality of mirrors,
    one of said mirrors being in viewing relations with the eyepiece.

8. In a reflective optical scanning arrangement to avoid rotation of an image being reflected therethrough,
    the combination of a relatively fixed frame,
    an eyepiece fixedly carried by the frame,
    a first gimbal carried by the frame for pivotal movement about a first axis,
    a second gimbal carried by said first gimbal for pivotal movement about a second axis perpendicular to said first axis,
    primary reflecting mirrors carried by said first and second gimbals and in fixed relation thereto and for movement therewith,
    a pair of secondary mirrors,
    one of said secondary mirrors being carried by a shaft for independent pivotal movement about the first axis,
    the other of said secondary mirrors being carried by a second shaft for independent pivotal movement about said second axis,
    one of said secondary mirrors being reflectively interposed between said primary mirrors,
    the other of said secondary mirrors being reflectively interposed between one of said primary mirrors and said eyepiece,
    a first means interconnecting said gimbals and said first secondary mirror to move the latter in response to movement of said second gimbal and through an arc equal to one-half the arcuate movement of said second gimbal,
    second means interconnecting said second secondary mirror and the frame and first gimbal and operative to move said second secondary mirror through an arc equal to one-half the arcuate movement of said first gimbal,
    said second secondary reflecting mirror being in viewing relation with said eyepiece.

9. An optical scanning arrangement according to claim 8,
    wherein said first interconnecting means comprises a first member engaging said first secondary reflecting mirror and pivotally connected to said first gimbal and a second member engaging said second secondary reflecting means and pivotally connected to said second gimbal,
    said second-mentioned interconnecting means comprising a first element engaging said second secondary reflecting mirrors and pivotally connected to said frame,
    and a second element engaging said second secondary reflecting mirrors and pivotally connected to said first gimbal.

References Cited

UNITED STATES PATENTS

| 2,505,819 | 5/1950 | Wrigley | 88—1 |
| 2,625,853 | 1/1953 | Hayward | 350—23 X |
| 2,933,814 | 4/1960 | Thompson | 88—1 |
| 2,964,996 | 12/1960 | Klemann et al. | 350—9 X |

DAVID SCHONBERG, *Primary Examiner.*

P. R. GILLIAM, *Assistant Examiner.*

U.S. Cl. X.R.

350—6, 7; 88—1